United States Patent
Yang

(10) Patent No.: US 8,203,647 B2
(45) Date of Patent: Jun. 19, 2012

(54) IMAGE SENSOR MODULE AND METHOD FOR MANUFACTURING THE SAME

(75) Inventor: Chuan-Hui Yang, Tainan County (TW)

(73) Assignee: Himax Semiconductor, Inc., Tainan (TW)

( * ) Notice: Subject to any disclaimer, the term of this patent is extended or adjusted under 35 U.S.C. 154(b) by 184 days.

(21) Appl. No.: 12/703,792

(22) Filed: Feb. 11, 2010

(65) Prior Publication Data
US 2011/0194022 A1    Aug. 11, 2011

(51) Int. Cl.
*H04N 5/225* (2006.01)
(52) U.S. Cl. .......... 348/374; 348/360
(58) Field of Classification Search .......... 348/340, 348/360, 374, 375
See application file for complete search history.

(56) References Cited

U.S. PATENT DOCUMENTS

| 6,384,397 B1 * | 5/2002 | Takiar et al. ...... 250/208.1 |
| 2005/0179805 A1 * | 8/2005 | Avron et al. ...... 348/340 |

FOREIGN PATENT DOCUMENTS
CN    1682377    10/2005
* cited by examiner

*Primary Examiner* — David Ometz
*Assistant Examiner* — Carramah J Quiett
(74) *Attorney, Agent, or Firm* — Jianq Chyun IP Office

(57) ABSTRACT

An image sensor module having a light gathering region and a light non-gathering region includes an image sensor, a lens barrel and a lens layer. The lens barrel is disposed on the image sensor and located in the light non-gathering region and has a through hole exposing a portion of the image sensor in the light gathering region. A material of the lens barrel includes a thermoplastic with a melting point higher than soldering temperature. The lens layer is disposed on an end portion of the lens barrel away from the image sensor and covers the through hole. The lens layer includes a glass substrate and a lens disposed on the glass substrate and located in the light gathering region.

18 Claims, 6 Drawing Sheets

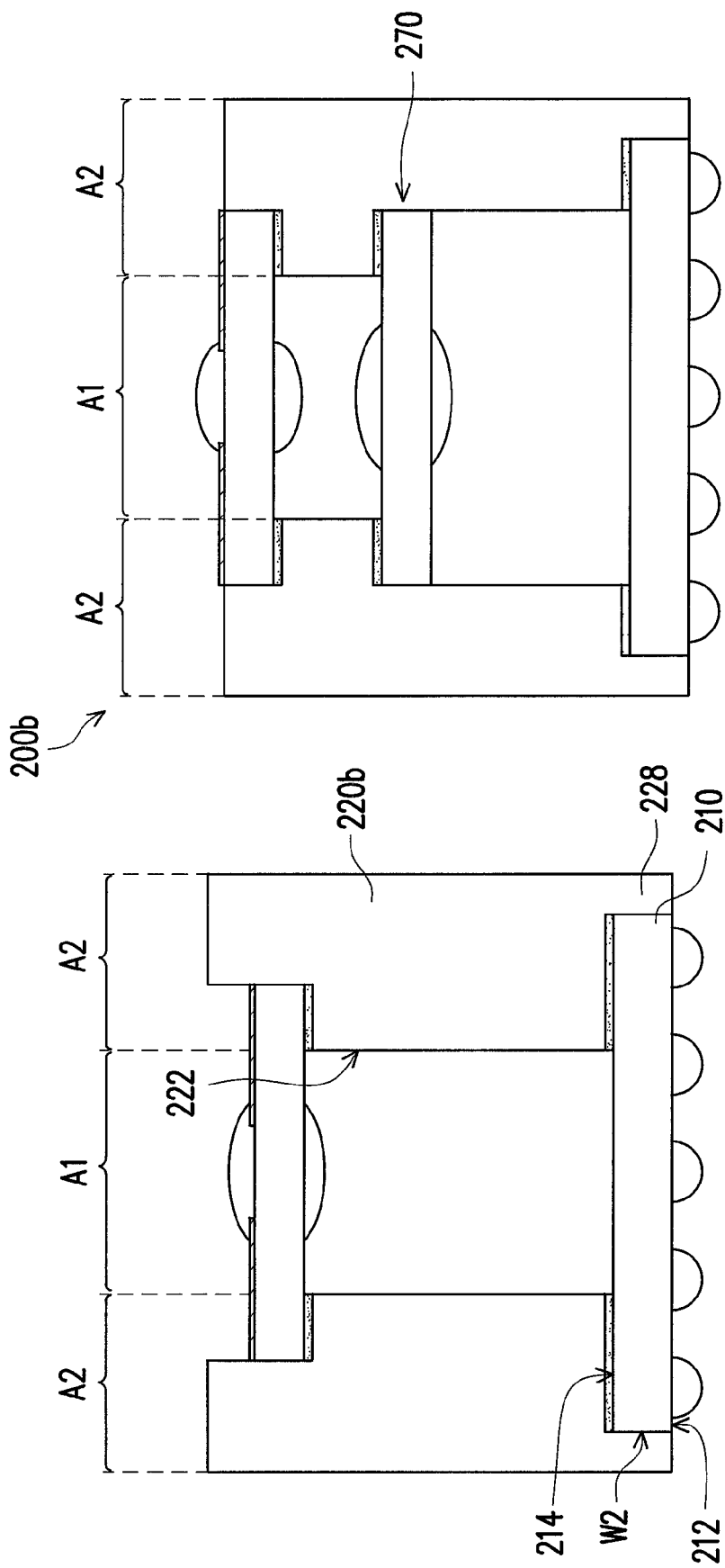

IMAGE SENSOR MODULE AND METHOD FOR MANUFACTURING THE SAME

BACKGROUND OF THE INVENTION

1. Field of the Invention

The present invention relates to an image sensor module and a method for manufacturing the same. More particularly, the present invention relates to a high temperature resistant image sensor module and a method for manufacturing the same.

2. Description of Related Art

Presently, a small image sensor device is generally integrated with a lens to form an image sensor module, and the image sensor module is installed in an electronic apparatus (for example, a mobile phone, a notebook computer, a video camera, or a camera, etc.).

FIG. 1 is a cross-sectional view of a conventional image sensor module. Referring to FIG. 1, the conventional image sensor module 100 includes a plastic lens 110, a lens barrel 120, a lens housing 130, a filter 140, an image sensor chip 150 and a circuit board 160. The image sensor chip 150 and the lens housing 130 are disposed on the circuit board 160, wherein the lens housing 130 has a through hole 132, and the image sensor chip 150 is disposed below the through hole 132. An external thread 122 of the lens barrel 120 fits an internal thread 132a in the through hole 132 of the lens housing 130, and the plastic lens 110 is engaged to a through hole 124 of the lens barrel 120. The filter 140 is disposed in the through hole 132 and located between the plastic lens 110 and the image sensor chip 150. External light can pass through the plastic lens 110 and the through hole 124 and irradiate the filter 140, and further irradiate the image sensor chip 150 after being filtered.

Since a part of the devices (such as the plastic lens 110, the lens barrel 120 and the lens housing 130) in the conventional image sensor module 100 are not high temperature resistant, the image sensor module 100 cannot be sent to a tin furnace for soldering with other electronic devices. Therefore, the image sensor module 100 is generally connected to the other electronic device through a connection device (not shown), which may results in a high fabrication cost and a large device size. Moreover, since a size of the lens housing 130 is relatively large, miniaturization of the image sensor module 100 is hard to achieve.

SUMMARY OF THE INVENTION

The present invention is directed to an image sensor module, which is high temperature resistant and has a relatively small size.

The present invention is directed to a method for manufacturing an image sensor module, by which a thermostability of the image sensor module is improved and a size of the image sensor module is reduced.

The present invention provides an image sensor module having a light gathering region and a light non-gathering region. The image sensor module includes an image sensor, a lens barrel and a first lens layer. The lens barrel is disposed on the image sensor, and is located in the light non-gathering region. The lens barrel has a through hole exposing a portion of the image sensor in the light gathering region. A material of the lens barrel includes a thermoplastic with a melting point higher than soldering temperature. The first lens layer is disposed on an end portion of the lens barrel away from the image sensor and covers the through hole. The first lens layer includes a first glass substrate and a first lens disposed on the first glass substrate and located in the light gathering region.

In an embodiment of the present invention, the thermoplastic includes liquid crystal polymer, PEEK, PCTFE, VESPEL.

In an embodiment of the present invention, the image sensor has a first surface, a second surface opposite to the first surface, and a sidewall connecting the first surface and the second surface. The lens barrel is disposed on the first surface and has an extension portion, wherein the extension portion wraps the sidewall of the image sensor.

In an embodiment of the present invention, the image sensor module further includes a light-shielding layer covering sidewalls of the lens barrel and the image sensor, and a material of the light-shielding layer is an opaque material.

In an embodiment of the present invention, the end portion of the lens barrel has a recess, and the through hole penetrates through a bottom of the recess, and an aperture diameter of the recess is greater than a diameter of the through hole. The first lens layer is disposed in the recess, and the first glass substrate is located on the bottom of the recess.

In an embodiment of the present invention, the image sensor module further includes a second lens layer disposed in the through hole. The second lens layer includes a second glass substrate and a second lens. The second glass substrate is connected to the lens barrel, and the second lens is disposed on the second glass substrate and is located in the light gathering region.

In an embodiment of the present invention, the lens barrel further includes a carrier portion, the carrier portion protrudes out from an inner wall of the through hole, and the second glass substrate is disposed on the carrier portion.

In an embodiment of the present invention, the image sensor module further includes an adhesion layer disposed between the lens barrel and the image sensor for adhering the lens barrel and the image sensor.

In an embodiment of the present invention, the image sensor module further includes an adhesion layer disposed between the lens barrel and the first lens layer for adhering the lens barrel and the first lens layer.

In an embodiment of the present invention, the image sensor module further includes an aperture layer disposed on the first glass substrate. The aperture layer has an opening exposing a portion of the first glass substrate in the light gathering region.

In an embodiment of the present invention, the first glass substrate has a first surface and a second surface opposite to the first surface. The first surface faces to the image sensor. The first lens layer further includes a second lens, and the first lens and the second lens are respectively disposed on the first surface and the second surface, and the first lens and the second lens are all located in the light gathering region.

In an embodiment of the present invention, a material of the first lens includes a resin material with a melting point higher than soldering temperature.

In an embodiment of the present invention, soldering temperature is about 250° C.

The present invention provides a method for manufacturing an image sensor module. First, a first lens layer and a lens barrel are provided, wherein the first lens layer includes a first glass substrate and a first lens, and the first lens is disposed on the first glass substrate. The lens barrel has a first end portion, a second end portion opposite to the first end portion, and a through hole penetrating through the first end portion and the second end portion, and a material of the lens barrel includes a thermoplastic with a melting point higher than soldering temperature. Then, the first lens layer is disposed on the first end portion of the lens barrel and covers the through hole, and the first lens is located above the through hole or located in the through hole. Then, the second end portion of the lens barrel is adhered to an image sensor, and the image sensor covers the through hole.

In an embodiment of the present invention, a method of providing the lens barrel includes injection molding the thermoplastic.

In an embodiment of the present invention, the thermoplastic includes liquid crystal polymer, PEEK, PCTFE, VESPEL.

In an embodiment of the present invention, the method for manufacturing the image sensor module further includes forming a light-shielding layer on sidewalls of the lens barrel and the image sensor after the second end portion of the lens barrel is adhered to the image sensor, and a material of the light-shielding layer is an opaque material.

In an embodiment of the present invention, soldering temperature is about 250° C.

According to the above descriptions, since the thermoplastic with a melting point higher than soldering temperature is used to form the lens barrel, and the first lens layer and the image sensor can also be formed by high temperature resistant materials, the image sensor module of the present invention is high temperature resistant.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3-6 are cross-sectional views of a plurality of variations of an image sensor module of FIG. 2.

DESCRIPTION OF THE EMBODIMENTS

Figure 1:
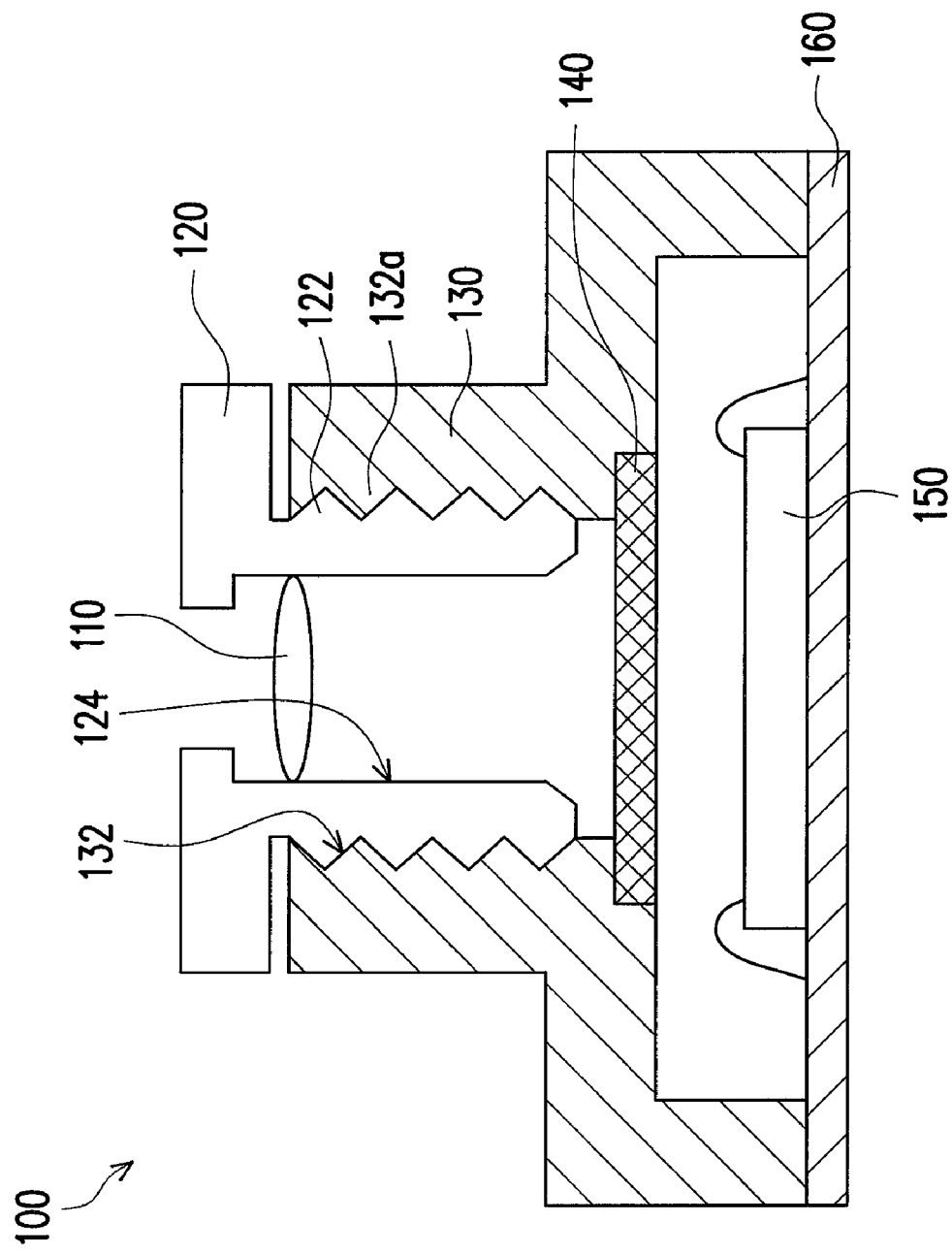
FIG. 1 is a cross-sectional view of a conventional image sensor module.

Reference will now be made in detail to the present preferred embodiments of the invention, examples of which are illustrated in the accompanying drawings. Wherever possible, the same reference numbers are used in the drawings and the description to refer to the same or like parts.

Figure 2:
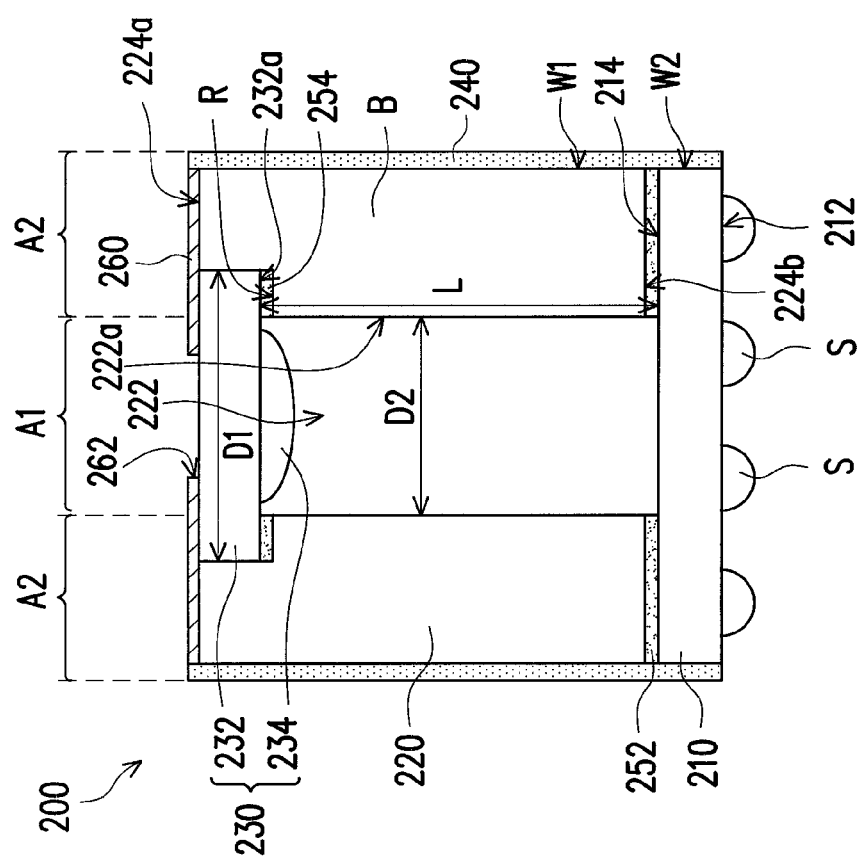
FIG. 2 is a cross-sectional view of an image sensor module according to an embodiment of the present invention.
Figure 4:
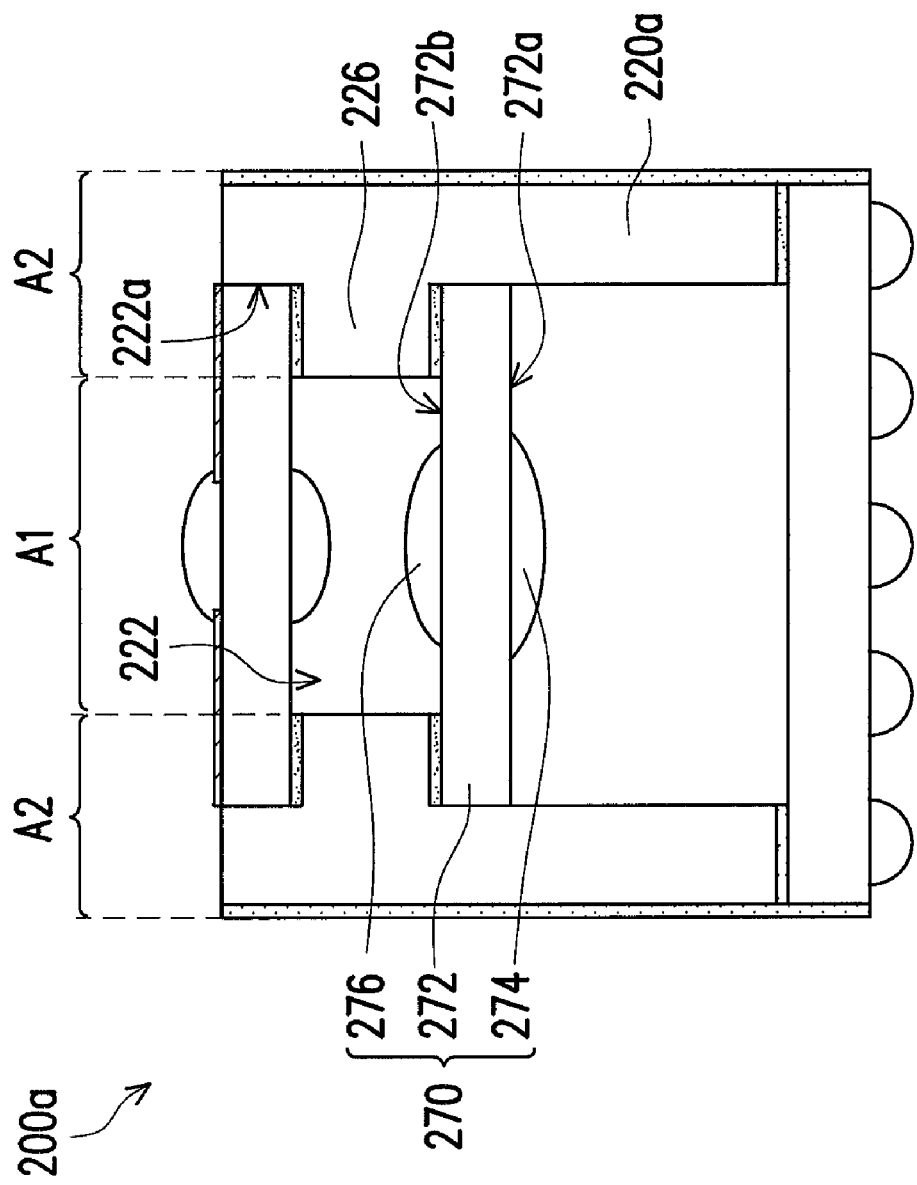

FIG. 2 is a cross-sectional view of an image sensor module according to an embodiment of the present invention. FIGS. 3-6 are cross-sectional views of a plurality of variations of the image sensor module of FIG. 2.

Referring to FIG. 2, the image sensor module 200 of the present embodiment has a light gathering region A1 and a light non-gathering region A2. The image sensor module 200 includes an image sensor 210, a lens barrel 220 and a first lens layer 230.

The image sensor 210 has two surfaces 212 and 214 opposite to each other, and the image sensor 210 is, for example, a complementary metal oxide semiconductor (CMOS) sensor. The lens barrel 220 has two end portions 224a and 224b opposite to each other. The end portion 224b of the lens barrel 220 is adhered on the surface 214 of the image sensor 210 through an adhesion layer 252, and is located in the light non-gathering region A2. The lens barrel 220 has a through hole 222 exposing a portion of the image sensor 210 in the light gathering region A1. A material of the lens barrel 220 includes a thermoplastic with a melting point higher than soldering temperature, which is, for example, a liquid crystal polymer (LCP) wherein soldering temperature is about 250° C., PEEK, PCTFE, VESPEL, for example. The material of the lens barrel 220 is, for example, an opaque material. In detail, in the present embodiment, the material of the lens barrel 220 can be an opaque thermoplastic with a good light absorption capability. Therefore, the lens barrel 220 can not only block the external light entering the through hole 222, but can also absorb flare irradiating an inner wall 222a of the through hole 222, so that an imaging quality of the image sensor module 200 can be improved.

In the present embodiment, the end portion 224a of the lens barrel 220 has a recess R, and the through hole 222 penetrates through a bottom B of the recess R. An aperture diameter D1 of the recess R is greater than an aperture diameter D2 of the through hole 222. The first lens layer 230 is adhered to the end portion 224a through an adhesion layer 254, and covers the through hole 222. The first lens layer 230 includes a first glass substrate 232 and a first lens 234. The first lens 234 is disposed on the first glass substrate 232 and is located in the light gathering region A1.

In detail, in the present embodiment, the first lens layer 230 is disposed in the recess R, and the first glass substrate 232 is located on the bottom B of the recess R. The adhesion layer 254 is located between the bottom B of the recess R and a surface 232a of the first glass substrate 232. In the present embodiment, the focusing can be performed by adjusting a distance L between the surface 232a of the first glass substrate 232 and the surface 214 of the image sensor 210, an a method for adjusting the distance L is to, for example, change a size of the lens barrel 220 (for example, change a thickness of the bottom B of the recess R). A material of the first lens 234 can be a resin material with a melting point higher than soldering temperature, which is about 250° C., for example.

In the present embodiment, to avoid the external light penetrating through sidewalls W1 and W2 of the lens barrel 220 and the image sensor 210 and entering the through hole 222 to cause the flare, a light-shielding layer 240 can be formed on the sidewalls W1 and W2, and a material of the light-shielding layer 240 is an opaque material.

In the present embodiment, to prevent the flare from entering the through hole 222, an aperture layer 260 can be disposed on the first glass substrate 232. The aperture layer 260 has an opening 262 exposing a portion of the first glass substrate 232 in the light gathering region A1. Moreover, in the present embodiment, a plurality of conductive bumps S can be configured on the surface 212 of the image sensor 210, so that the image sensor 210 can be electrically connected to the other electronic devices (for example, a circuit board) through the conductive bumps S.

It should be noticed that since the thermoplastic with a melting point higher than soldering temperature is used to form the lens barrel 220, and the materials of the first lens layer 230 and the image sensor 210 can also be high temperature resistant materials, the image sensor module 200 of the present invention is high temperature resistant. Accordingly, the image sensor module 200 of the present embodiment can be directly sent to a tin furnace for soldering with the other electronic devices. Therefore, configuration of conventional connection devices in the image sensor module 200 is unnecessary, so that the fabrication cost and a whole size of the image sensor module 200 are reduced.

Figure 3:
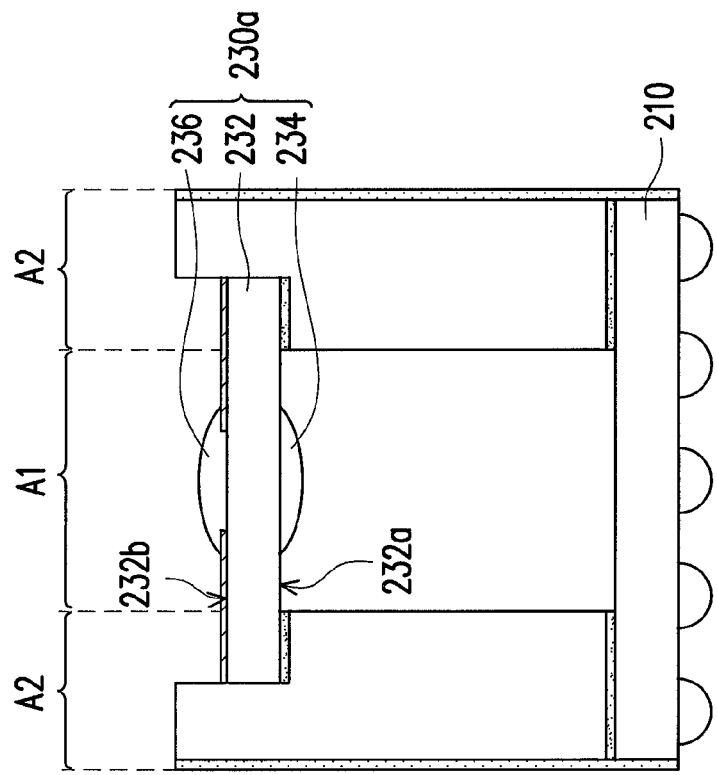

Moreover, in another embodiment, a first lens layer 230a can further include a second lens 236 (shown in FIG. 3). In detail, the first glass substrate 232 has a first surface 232a and a second surface 232b opposite to each other, wherein the first surface 232a faces to the image sensor 210. The first lens 234 and the second lens 236 are respectively disposed on the first surface 232a and the second surface 232b, and the first lens 234 and the second lens 236 are all located in the light gathering region A1.

In another embodiment, an image sensor module 200a further includes a second lens layer 270 (shown in FIG. 4), and the lens barrel 220a further includes a carrier portion 226. In detail, the carrier portion 226 protrudes out from the inner wall 222a of the through hole 222, and the second lens layer 270 is disposed on the carrier portion 226. The second lens layer 270 includes a second glass substrate 272, a second lens 274 and a third lens 276. The second glass substrate 272 leans against the carrier portion 226, and the second lens 274 and the third lens 276 are respectively disposed on two opposite surfaces 272a and 272b of the second glass substrate 272, and are located in the light gathering region A1.

In an embodiment, a lens barrel 220b further has an extension portion 228 (shown in FIG. 5), and the extension portion 228 wraps the sidewall W2 of the image sensor 210. In detail, the image sensor 210 has two surfaces 212 and 214 opposite to each other and a sidewall W2 connecting the two surfaces 212 and 214 (shown in FIG. 5). The lens barrel 220b is disposed on the surface 214, and the extension portion 228 extends from the surface 214 towards the sidewall W2 for wrapping the sidewall W2. Therefore, when the material of the lens barrel 220b is the opaque material, the extension portion 228 can effectively block the external light, so as to prevent the external light from penetrating through the sidewall W2 of the image sensor 210 and entering the through hole 222 to cause the flare. Moreover, the image sensor module 200b can further include the second lens layer 270 (shown in FIG. 6). A configuration method of the second lens layer 270 is the same to that of the second lens layer 270 of FIG. 4, and therefore detail description thereof is not repeated.

Figure 7B:
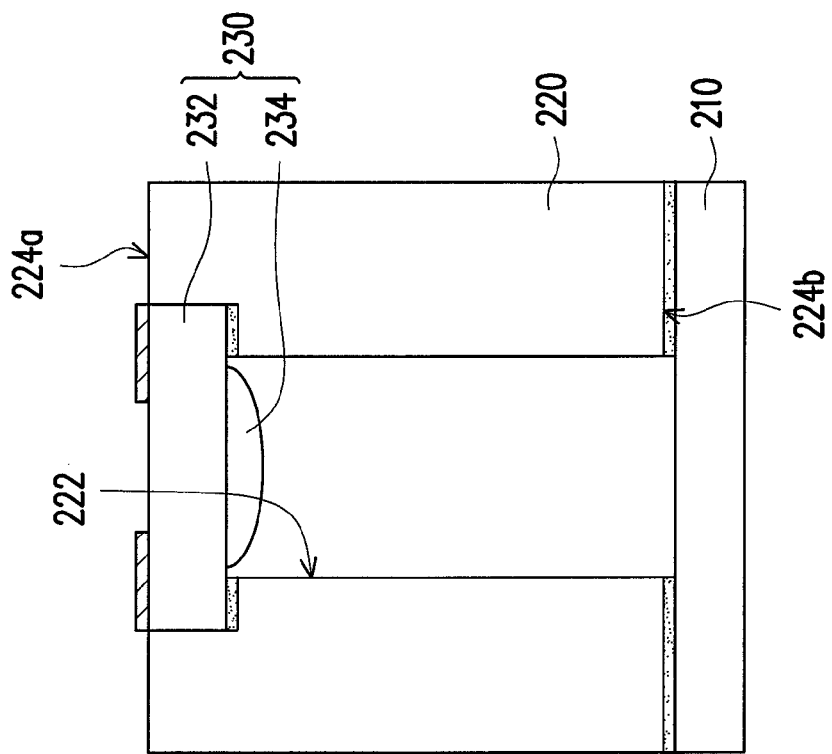
FIGS. 7A-7C are cross-sectional views illustrating a manufacturing process of an image sensor module according to an embodiment of the present invention.
Figure 7A:
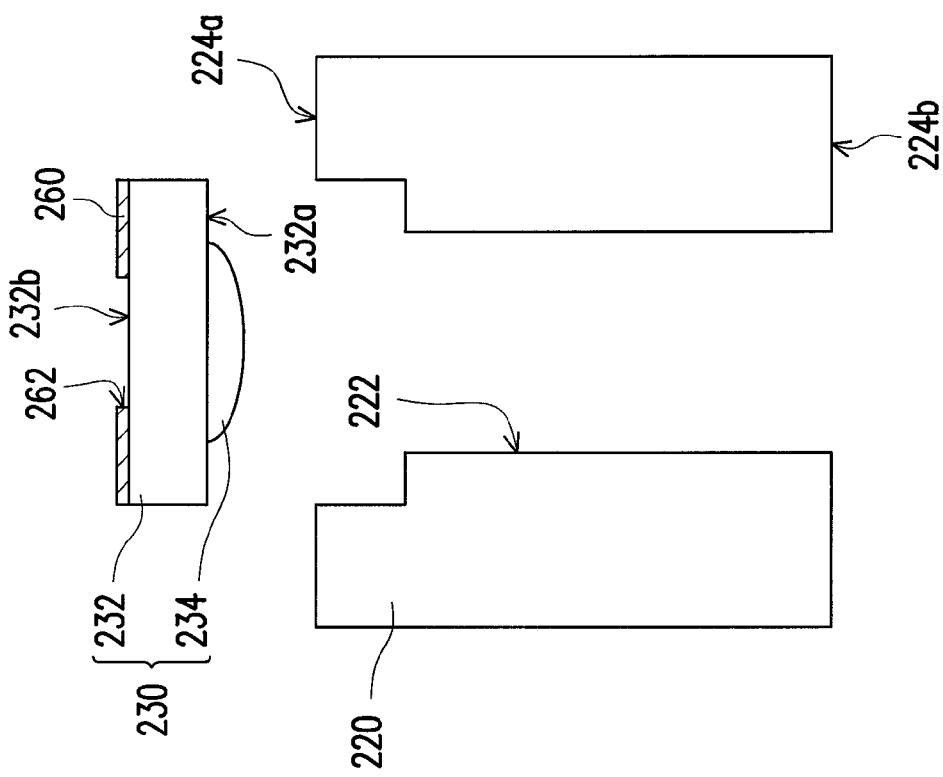
Figure 7C:
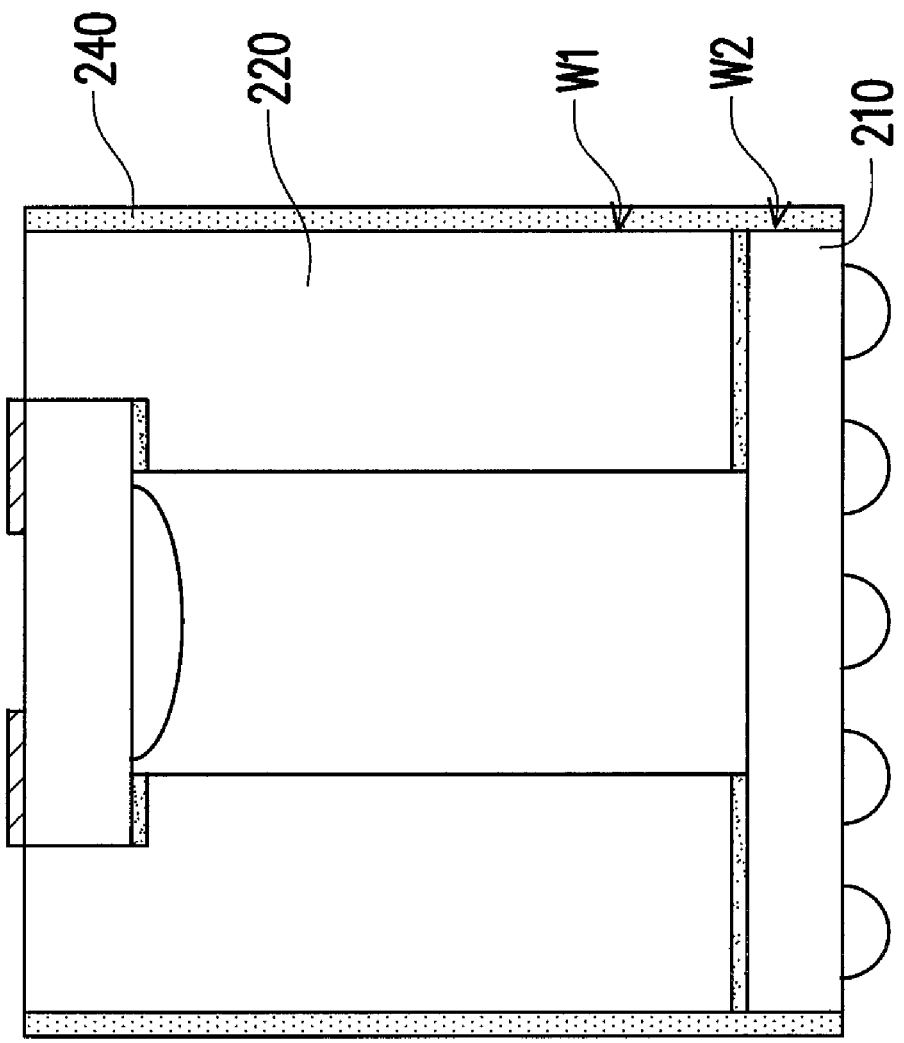

FIGS. 7A-7C are cross-sectional views illustrating a manufacturing process of an image sensor module according to an embodiment of the present invention.

First, referring to FIG. 7A, a first lens layer 230 and a lens barrel 220 are provided. The first lens layer 230 includes a first glass substrate 232 and a first lens 234, and the first lens 234 is disposed on the first glass substrate 232. In the present embodiment, an aperture layer 260 can be formed on the first glass substrate 232, and the aperture layer 260 has an opening 262 relative to the first lens 234. The first lens 234 and the aperture layer 260 can be located on two opposite surfaces 232a and 232b of the first glass substrate 232. In another embodiment that is not illustrated, the first lens 234 and the aperture layer 260 can also be disposed on a same plane (the surface 232a or the surface 232b) of the first glass substrate 232, and the first lens 234 covers the opening 262 of the aperture layer 260.

The lens barrel 220 has two end portions 224a and 224b opposite to each other and a through hole 222 penetrating through the end portions 224a and 224b. A material of the lens barrel 220 includes a thermoplastic with a melting point higher than soldering temperature. In the present embodiment, a method of providing the lens barrier 220 includes injection molding the thermoplastic, wherein the thermoplastic includes liquid crystal polymer, PEEK, PCTFE, VESPEL.

Then, referring to FIG. 7B, the first lens layer 230 is disposed on the end portion 224a of the lens barrel 220, and covers the through hole 222, and the first lens 234 is located in the through hole 222. Then, the end portion 224b of the lens barrel 220 is adhered to an image sensor 210, and the image sensor 210 covers the through hole 222.

Then, referring to FIG. 7C, a light-shielding layer 240 is formed on sidewalls W1 and W2 of the lens barrel 220 and the image sensor 210, and a material of the light-shielding layer 240 is an opaque material.

In summary, since the thermoplastic with a melting point higher than soldering temperature is used to form the lens barrel, and the first lens layer and the image sensor can also be formed by high temperature resistant materials, the image sensor module of the present invention is high temperature resistant. Accordingly, the image sensor module of the present invention can be directly sent to a tin furnace for soldering with the other electronic devices. Therefore, configuration of the conventional connection devices in the image sensor module is unnecessary, so that the fabrication cost and a whole size of the image sensor module are reduced. Moreover, an opaque thermoplastic with a good light absorption capability can be used to form the lens barrel. Therefore, the lens barrel can not only block the external light entering the through hole, but can also absorb the flare irradiating the inner wall of the through hole, so that an imaging quality of the image sensor module can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image sensor module, having a light gathering region and a light non-gathering region, comprising:
    an image sensor;
    a lens barrel, disposed on the image sensor and located in the light non-gathering region, and having a through hole exposing a portion of the image sensor in the light gathering region, and a material of the lens barrel comprising a thermoplastic with a melting point higher than soldering temperature; and
    a first lens layer, disposed on an end portion of the lens barrel away from the image sensor and covering the through hole, and comprising a first glass substrate and a first lens, wherein the first lens is disposed on the first glass substrate and located in the light gathering region.

2. The image sensor module as claimed in claim 1, wherein the thermoplastic comprises liquid crystal polymer, PEEK, PCTFE, VESPEL.

3. The image sensor module as claimed in claim 1, wherein the image sensor has a first surface, a second surface opposite to the first surface, and a sidewall connecting the first surface and the second surface, the lens barrel is disposed on the first surface and has an extension portion, wherein the extension portion wraps the sidewall of the image sensor.

4. The image sensor module as claimed in claim 1, further comprising:
    a light-shielding layer, covering sidewalls of the lens barrel and the image sensor, and a material of the light-shielding layer being an opaque material.

5. The image sensor module as claimed in claim 1, wherein the end portion of the lens barrel has a recess, and the through hole penetrates through a bottom of the recess, and an aperture diameter of the recess is greater than an aperture diameter of the through hole, the first lens layer is disposed in the recess, and the first glass substrate is located on the bottom of the recess.

6. The image sensor module as claimed in claim 1, further comprising:
   a second lens layer, disposed in the through hole, the second lens layer comprising a second glass substrate and a second lens, wherein the second glass substrate is connected to the lens barrel, and the second lens is disposed on the second glass substrate and is located in the light gathering region.

7. The image sensor module as claimed in claim 6, wherein the lens barrel further comprises a carrier portion, the carrier portion protrudes out from an inner wall of the through hole, and the second glass substrate is disposed on the carrier portion.

8. The image sensor module as claimed in claim 1, further comprising:
   an adhesion layer, disposed between the lens barrel and the image sensor for adhering the lens barrel and the image sensor.

9. The image sensor module as claimed in claim 1, further comprising:
   an adhesion layer, disposed between the lens barrel and the first lens layer for adhering the lens barrel and the first lens layer.

10. The image sensor module as claimed in claim 1, further comprising:
    an aperture layer, disposed on the first glass substrate, and having an opening exposing a portion of the first glass substrate in the light gathering region.

11. The image sensor module as claimed in claim 1, wherein the first glass substrate has a first surface and a second surface opposite to the first surface, the first surface faces to the image sensor, and the first lens layer further comprises:
    a second lens, the first lens and the second lens being respectively disposed on the first surface and the second surface, and the first lens and the second lens being all located in the light gathering region.

12. The image sensor module as claimed in claim 1, wherein a material of the first lens comprises a resin material with a melting point higher than soldering temperature.

13. The image sensor module as claimed in claim 1, wherein soldering temperature is about 250° C.

14. A method for manufacturing an image sensor module, comprising:
    providing a first lens layer and a lens barrel, wherein the first lens layer comprises a first glass substrate and a first lens, and the first lens is disposed on the first glass substrate, the lens barrel has a first end portion, a second end portion opposite to the first end portion and a through hole penetrating through the first end portion and the second end portion, and a material of the lens barrel comprises a thermoplastic with a melting point higher than soldering temperature;
    disposing the first lens layer on the first end portion of the lens barrel for covering the through hole, wherein the first lens is located above the through hole or located in the through hole; and
    adhering the second end portion of the lens barrel to an image sensor, wherein the image sensor covers the through hole.

15. The method for manufacturing an image sensor module as claimed in claim 14, wherein a method of providing the lens barrel comprises injection molding the thermoplastic.

16. The method for manufacturing an image sensor module as claimed in claim 15, wherein the thermoplastic comprises liquid crystal polymer, PEEK, PCTFE, VESPEL.

17. The method for manufacturing an image sensor module as claimed in claim 14, further comprising:
    forming a light-shielding layer on sidewalls of the lens barrel and the image sensor after the second end portion of the lens barrel is adhered to the image sensor, wherein a material of the light-shielding layer is an opaque material.

18. The method for manufacturing an image sensor module as claimed in claim 14, wherein soldering temperature is about 250° C.

* * * * *